(12) United States Patent
Dressler et al.

(10) Patent No.: US 7,754,277 B2
(45) Date of Patent: Jul. 13, 2010

(54) METHOD FOR ANTI-STATICALLY COATING THE SURFACES OF PLASTIC MOULDED PARTS OR PLASTIC OR PAINT COATINGS

(75) Inventors: Franz Dressler, Niedernhausen (DE); Eckart Schonfelder, Idstein (DE)

(73) Assignee: Chemetall GmbH, Frankfurt (DE)

( * ) Notice: Subject to any disclaimer, the term of this patent is extended or adjusted under 35 U.S.C. 154(b) by 584 days.

(21) Appl. No.: 10/487,131

(22) PCT Filed: Aug. 16, 2002

(86) PCT No.: PCT/DE02/03066

§ 371 (c)(1),
(2), (4) Date: Jun. 1, 2004

(87) PCT Pub. No.: WO03/018676

PCT Pub. Date: Mar. 6, 2003

(65) Prior Publication Data

US 2004/0209101 A1   Oct. 21, 2004

(30) Foreign Application Priority Data

Aug. 25, 2001 (DE) .............................. 101 41 707

(51) Int. Cl.
*B05D 5/12* (2006.01)

(52) U.S. Cl. ..................................................... 427/121
(58) Field of Classification Search .................. 427/121
See application file for complete search history.

(56) References Cited

U.S. PATENT DOCUMENTS

| 3,044,962 A | | 7/1962 | David et al. | |
| 4,371,489 A | | 2/1983 | McGrail | |
| 4,627,936 A | | 12/1986 | Gould et al. | |
| 4,678,605 A | * | 7/1987 | Geke et al. ................ | 510/259 |
| 5,094,909 A | * | 3/1992 | Tachibana et al. ........... | 428/327 |
| 5,296,273 A | * | 3/1994 | Abe et al. .................... | 427/553 |
| 5,372,924 A | * | 12/1994 | Quintens et al. ............ | 430/527 |

FOREIGN PATENT DOCUMENTS

| JP | 5-302077 A | | 11/1993 |
| JP | 07-070556 A | | 3/1995 |
| JP | 7-70556 A | | 3/1995 |
| JP | 07070556 A | * | 3/1995 |

* cited by examiner

*Primary Examiner*—Timothy Meeks
*Assistant Examiner*—Kelly M Gambetta
(74) *Attorney, Agent, or Firm*—Fulbright & Jaworski L.L.P.

(57) ABSTRACT

An automated process for the antistatic coating of plastic molding surfaces or for plastic-based or lacquer-based coatings by contacting the surface with a solution containing at least one surfactant, at least 20 wt. % of an organic solvent and, optionally, water.

42 Claims, No Drawings

METHOD FOR ANTI-STATICALLY COATING THE SURFACES OF PLASTIC MOULDED PARTS OR PLASTIC OR PAINT COATINGS

This is a §371 of PCT/DE02/03066 filed Aug. 16, 2002, which claims priority from German 101 41 707.1 filed Aug. 25, 2001. All of these are hereby incorporated by reference in their entireties.

BACKGROUND AND SUMMARY

The invention relates to an automated process for the antistatic coating of plastic moulding surfaces or for the antistatic coating of plastic-based or lacquer-based coatings.

Plastic mouldings or plastic-based and/or lacquer-based coatings are currently used in many ways. They are frequently used e.g. as plastic add-on parts or plastic-coated/lacquer-coated parts in the automotive industry and other branches of industry, and in plastics manufacturing sectors. The antistatic behaviour has many problems associated with it, especially where plastic surfaces are machined e.g. by grinding.

The plastic mouldings can be produced in any desired manner. Their manufacturing processes, their structure and their composition are known in principle. The plastic mouldings are preferably produced by injection moulding or by casting into a mould, optionally with the use of a reinforcing matrix.

The production of plastic coatings, e.g. on construction elements such as panelling, on furniture or as films, or the production of lacquer coatings, is also known in principle. In terms of the present patent application, "lacquer" also includes lacquer-like polymer coatings. Mouldings that are only partially lacquered, for which adjacent plastic and lacquer have to be protected simultaneously from high electrical charge, are e.g. partially lacquered mouldings or add-on parts.

Because of their susceptibility to electrostatic charge, plastic mouldings or plastic and/or lacquer coatings are at particular risk of contamination and often need antistatic protection.

Nowadays, plastic mouldings conventionally have to be washed prior to lacquering so as to remove as much contamination as possible from the surfaces to be lacquered. This process is intended to remove, inter alia, the contamination acquired during transportation and/or storage.

An example of a washing process suitable for this purpose is the powerwash process, in which the mouldings are treated with water, e.g. by spraying or dipping. It can be carried out at a pressure ranging from 0.5 to 2 bar without the mouldings being clamped or supported, usually at a pressure of up to 2 bar in the case of mouldings in a fixed position, or optionally at a higher pressure. The wash waters used can have a pH preferably ranging from 2 to 12 as they do not usually attack the plastic and lacquer surfaces. Mouldings coated with plastic and/or lacquer can consist substantially of metal, glass, ceramic, wood, plastic, composite materials and/or material composites, etc. The plastic coating can be applied in one or more layers. This pressure washing process is described on page 9 of the GE Plastics "Painting guide", edition August 1998.

An acidic wash water for such a washing process often contains at least one inorganic and/or organic acid, for example phosphoric acid, gluconic acid and/or glycolic acid. The wash water can also contain at least one corrosion inhibitor. The acid can be buffered and/or partially neutralized.

An alkaline wash water often contains at least one alkalinity carrier selected from the group comprising e.g. a carbonate, a hydroxide, an alkaline salt and an amine such as an alkanolamine.

The wash water usually also contains at least one surfactant and optionally further additives as well, e.g. at least one sequestering agent for dispersing the suspended matter, biocides and/or solubilizers.

If such a wash water is used at a pressure of up to 2 bar, or even more, for the treatment of a contaminated moulding surface, only the loose dirt not adhering electrostatically is removed. The electrostatically adhering dirt, which often consists substantially of specifically charged particles having sizes ranging preferentially from 0.05 to 5 μm, can normally only be removed to a very limited extent by a washing process under pressure.

Automated washing processes other than the powerwash process which are otherwise frequently used prior to lacquering are normally unsuitable for the removal of contamination occurring as a result of antistatic charge.

At present, the only possible way of removing electrostatically adhering dirt is mechanical removal by wiping or brushing. The manual removal of electrostatically adhering dirt immediately before the powerwash process is often no longer justifiable in mass production. Solutions normally based on isopropanol and/or water may be used for this purpose.

However, the cost of the measures taken to avoid electrostatically adhering dirt, such as the dust-free packaging of parts in sealed containers or storage in dust-free rooms, is many times the normal cost of storing parts treated with antistatic agents. The cost of totally removing dust is extremely high because it demands air filtration, locks, dust-avoiding conveying and transportation technology, dust-free clothing, appropriate worker behaviour, many structural requirements for avoiding dust and keeping it away, such as seals and floor structure, etc.

It has been found that the preparations and chemical compounds described in the literature for preventing electrostatic charge arising due to friction, and preventing moulding surfaces from becoming laden with electrostatically adhering dirt, are unsuitable for the subsequent powerwash process. To the Applicant's knowledge, the only known solutions for the antistatic coating of plastic surfaces to avoid charging are those which contain quaternary ammonium compounds. However, these cannot be used on their own because of the very intense foaming in the subsequent powerwash process.

EP 0 971 005 A1 describes a process for the temporary protection of plastic objects from electrical charge and the associated contamination using a composition containing conductive polymer as antistatic agent and water and/or organic solvent.

DE 197 07 650 A1 relates to antistatic cleaning agent concentrates that produce an antistatic cleaning solution when water is added, said concentrates comprising alkoxylated primary or secondary amines, fatty acid salts, e.g. alkanolamines, and low-foaming non-ionic surfactants, optionally with other auxiliary substances and active ingredients.

GB 2 203 162 A protects aqueous antistatic solutions based on water-soluble non-ionic antistatic agents and coconut oil fatty acid amide, the latter being said to act as solubilizer to stabilize the composition. The Examples also mention that the composition contains a quaternary ammonium compound and a cosolvent.

U.S. Pat. No.3,044,962 A teaches a process for the preparation of a cleaning composition from 1. an alcoholic solution of a surface-active agent selected from quaternary ammonium, phosphonium and morpholine salts, 2. a sodium salt, and 3. an organic anionic surface-active agent.

EP 1 111 036 A2 relates to a cleaning medium containing a dispersible abrasive which is said to act as an acidic abrasive cleaner.

U.S. Pat. No. 4,371,489 A protects a process for the production of molecularly orientated thermoplastic films with an antistatic film-forming coating comprising an acrylic/methacrylic copolymer, a crosslinking agent and a partially neutralized, acidic phosphate ester of defined composition.

Finally, DE 195 26 742 A1 relates to a polymer dispersion containing a water-soluble or finely dispersed antistatic agent. The polymer dispersion contains 50 to 95 wt. % of polymer.

One object is therefore to propose a process in which the plastic moulding surface or the plastic and/or lacquer coating is coated in such a way that the surface is not more strongly electrostatically charged, so that the dirt is not more strongly electrostatically attracted due to the field of the plastic or lacquer and cannot collect in a more strongly electrostatically charged state. Another object is to overcome the disadvantages of the state of the art and, in particular, to propose a process for avoiding dirt on organic surfaces which is difficult to remove, which process can be carried out prior to storage in the simplest possible and most cost-effective way, especially following the manufacture of a moulding or the coating of a moulding with a layer of plastic or lacquer, and does not interfere with the subsequent treatment in the powerwash process.

It has been found that, with the process according to the invention, the electrostatically charged dirt, consisting predominantly of particles in the size range from 0.05 to 5 μm, only settles on the moulding surface to a very small extent and/or in larger, readily removable particles, and that the contamination on the moulding surface coated according to the invention can be washed off unexpectedly well, e.g. in the powerwash process, with a wash water containing surfactant.

Because of the applied layer of surfactant, the plastic moulding surfaces antistatically coated according to the invention have more strongly hydrophilic surface properties that prevent a strong electrostatic charging of the plastic moulding surface or the plastic or lacquer surface.

The object is achieved by the process according to the present invention, which relates to an automated process for the antistatic coating of plastic molding surfaces after production of the plastic molding or after subsequent optional working of the molding or finishing of the surface, and before cleaning of the plastic molding by an aqueous washing process, and/or before polarization by chemical and/or physical methods, or for the antistatic coating of the surface of a plastic-coated and/or lacquer-coated molding, optionally after surface finishing, and before cleaning and/or polarization, the molding then optionally being lacquered, characterized in that an antistatic coating is applied by bringing the plastic and/or lacquer surface into contact with a solution containing at least one surfactant and at least 20 wt. % of at least one organic solvent and optionally water, the volatile constituents extensively or completely evaporating and a film containing surfactant being dried on, in order extensively or completely to prevent particle contamination due to electrostatic charging until the molding is cleaned and/or polarized, and in order to produce extensively or completely clean plastic and/or lacquer surfaces after the cleaning and/or polarization. The plastic and/or lacquer surfaces treated by the process may be used in the automotive industry and automotive component supply industry, for railway vehicles, for the aeronautical and space industry, for electrical engineering, electronics, domestic appliances, panelling, cladding elements, housings and clocks, for the building industry, for the furniture industry, in apparatus and machine engineering, in plastics manufacturing sectors or in sectors where plastic and/or lacquer surfaces are machined e.g. by drilling, deburring, milling or grindng.

Substantial evaporation signifies here that the surfactant film binds at least one molecular layer of water from the solution and/or from the ambient atmosphere. It is desirable for the solvent mixture to contain water because water, especially an increased water content and a reduced content of organic solvents, is more favourable for reasons of industrial safety, environmental protection and the costs of solvents or exhaust air treatment.

Coating with an antistatic solution is of particular interest as a temporary protection for storage, transportation and/or further processing by machining, coating processes and cleaning, and/or particularly before the final lacquering of mouldings coated in this way, especially where motor vehicle add-on parts are concerned. In such cases the solvents in the antistatic solution evaporate extensively. After drying, the solution produces a film whose weight often ranges from 0.5 to 500 mg/m$^2$, preferably from 0.6 to 200 mg/m$^2$, particularly preferably from 0.8 to 100 mg/m$^2$ and very particularly preferably from 2 to 50 mg/m$^2$.

In some cases a polarization of the plastic or the plastic or lacquer surface is carried out in order to produce polar groups on the surface and to increase the surface tension. Polarization, e.g. by flaming, UV treatment, corona treatment or plasma treatment, effects a partial oxidation of the plastic or lacquer surface. Polarization causes hydrophilic groups to form on the plastic and/or lacquer surface and hence makes it more readily wettable by e.g. lacquers.

In the antistatic coating process according to the invention, the surfactant(s) contained in the water can be chosen so as to cause only very little foaming, if any, in the subsequent washing process. Foaming can occur especially when spraying with wash water at high pressures. The foaming, which occurs as a result of the surfactant content and other operating conditions, should not be so intense as to detract from the washing process. It is therefore advisable for at least one of the surfactants in the antistatic solution to be of a non-ionic nature.

In the antistatic coating solution, it is advisable for one or more of the surfactants of the surfactant mixture in the antistatic solution to have a cloud point that is at least 5° C. and at most 40° C. below the temperature of the subsequent washing process used. If surfactants with a cloud point, i.e. surfactants of a non-ionic nature, are used, it is advantageous if, above the cloud point, these surfactants are no longer present in dissolved form in the wash medium of the washing process, so as to minimize foaming, especially when spraying. It can therefore be advantageous to use only non-ionic surfactants. The subsequent washing process is preferably operated by spraying the wash water in the temperature range from 40 to 80° C. and especially from 50 to 65° C. Even though foaming when dipping is often only slight compared with foaming when spraying, operating conditions can occur under which foaming should be reduced when dipping. The temperatures of the washing process by dipping are preferably in the range from 50 to 90° C. and especially from 65 to 80° C. The cloud point is governed by the choice of surfactant(s).

The surfactant(s) in the antistatic solution preferably have a degree of water solubility or a good water solubility, being at least 0.1 g/l in water at 25° C. and preferably at least 1 g/l. The surfactant(s) should also preferably have a degree of solubility or a good solubility in the organic solvent(s). It is advisable for the surfactant or surfactant mixture in the antistatic solution to be completely soluble in the solvent mixture at 25° C. When, after application of the antistatic solution, the organic solvent has extensively or completely evaporated, the surfactant(s) should advantageously be soluble in the remaining amount of water or solvent mixture and/or should have been distributed directly over the surface as homogeneously as possible.

As e.g. plastic injection mouldings are usually still at an elevated temperature for a few minutes after production, the evaporation of the solvent from the solution containing the antistatic agent may be increased. The desired homogeneous surfactant-containing film can thus be formed more rapidly. If, however, the temperature of the mouldings to be coated antistatically is too high, e.g. above the boiling point of the solvent or solvent mixture, the surfactant-containing films may no longer be formed homogeneously.

In terms of chemical composition, the surfactant(s) in the antistatic solution are advantageously similar or identical to the surfactant(s) contained in the aqueous solution used in the washing process. It is therefore advisable for the surfactant(s) in the antistatic solution to be selected from the same chemical group of non-ionic surfactants, especially the groups comprising ethoxylated/propoxylated alkyl alcohols, as the surfactant(s) in the wash medium. With regard to the surfactants used, the surfactant mixture in the antistatic solution can be similar to that in the wash medium.

The surfactant(s) in the antistatic solution and/or in the subsequent washing process should be chosen so as not to have an adverse effect on the subsequent washing process or the properties of the plastic and/or lacquer surface. It is desirable for the surfactant layer remaining on the plastic and/or lacquer surface after washing to consist of only one or a small number of molecular layers.

An unsuitable surfactant can detract not only from the foaming, but also from the wetting, the cleaning quality, the useful life of the wash medium (bath) and hence the mode of action of the washing process. Furthermore, an unsuitable surfactant can cause precipitation due to chemical and/or physical interactions or reactions with other components of the wash medium. Moreover, an unsuitable surfactant in the antistatic solution and/or the washing process may in some cases remain on the plastic and/or lacquer surface in somewhat thicker layers, possibly detracting from the subsequent working steps: For example, during rinsing, which is the last step of the washing process, the rinse baths may become contaminated and surfactant residues may therefore remain on the surface in the subsequent drying process. The surfactant residues accumulating on the plastic and/or lacquer surface can interfere with the lacquer flow (lacquer too thin or absent in places) and the lacquer adhesion, which can impair the external visual appearance of the lacquered surface and the suitability of the lacquer layer due to readily occurring cracking and flaking of the lacquer. Also, an unsuitable surfactant in the antistatic solution can migrate into the plastic or lacquer from the surface, which in particular can create cracks in the plastic moulding or lacquer and affect the mechanical properties of the plastic moulding or lacquer in such a way that the surface region can become more brittle and be damaged more easily by impact, or the strength of the plastic and/or the moulding/lacquer composite can be reduced.

Surprisingly, surfactants or surfactant mixtures have been found which make it possible to avoid all the possible deficiencies in such a process.

The surfactant or surfactant mixture in the antistatic solution is preferably chosen so as to ensure a good wettability of the plastic and/or lacquer surface by the antistatic solution without thereby causing more intense foaming in the subsequent washing process.

DETAILED DESCRIPTION

The plastic or lacquer surface conventionally has a surface tension ranging from 16 to 48 mN/m (Table 1). In particular, with the surfactant or surfactant mixture according to the invention in the antistatic solution, the surface tension of the plastic or lacquer surface is increased by at least 1 mN/m, preferably by at least 2 mN/m and particularly preferably by at least 3 mN/m. The surface tension of e.g. PE and PP films can be measured by means of test inks by UC method WC-81-B-DIN 53364 and compared with the surface tension of the untreated, clean and dry plastic and/or lacquer surface. The change in surface tension indicates the presence of an antistatically active coating of hydrophilic character. In many cases the increase in surface tension is so small that the measurement can no longer be made accurately with test inks and this increase can disappear at various places into the background of the readily fluctuating starting values of the surface tension of the plastic surface. Preferably, the surfactant mixture in the antistatic solution gives the plastic or lacquer surface a surface tension greater than 30 mN/m and particularly preferably greater than 35 or even 40 mN/m.

TABLE 1

Surface tension of plastics

| Substrate surface | Surface tension (mN/m) |
|---|---|
| Polyethylene (PE) | 31 |
| Polystyrene (PS) | 34 |
| Polyvinyl chloride (PVC) | 39 |
| Polymethyl methacrylate (PMMA) | 39 |
| Polyvinylidene chloride | 40 |
| Polyethylene terephthalate (PET) | 43 |
| Polyamide 6,6 | 46 |

The antistatic coating according to the invention makes it possible to ensure that the electrostatic charge on the antistatically coated plastic or lacquer surface does not exceed values of 1000 V. The electrostatic charge has values preferably ranging from only 0.1 to 500 V and particularly preferably ranging from 0.2 to 200 V. Measurement was made by determining the static charge with a field intensity meter such as an FMX-002 from Simco/NL. By comparison, the electrostatic charge on the clean, dry plastic or lacquer surface prior to antistatic coating often has values ranging from 10 to 75 kV.

The surfactant(s) in the antistatic solution are preferably selected from the group comprising ethoxylated alkyl alcohols, ethoxylated/propoxylated alkyl alcohols, ethoxylated alkyl alcohols with end group capping and ethoxylated/propoxylated alkyl alcohols with end group capping, it being possible for the alkyl group of the alkyl alcohols—saturated or unsaturated—to have an average number of carbon atoms ranging from 6 to 22 and either a linear or a branched chain structure, it being possible for the alkyl moiety optionally to have one or more aromatic and/or phenolic groups, it being possible for the ethylene oxide chain to have an average of 2 to 30 ethylene oxide units, it optionally being possible for the propylene oxide chain to have an average of 1 to 25 propylene oxide units, and it optionally being possible for end group capping to be present in the form of an alkyl group having an average of 1 to 8 carbon atoms. Preferably, the average number of carbon atoms in the surfactant ranges from 10 to 14 carbon atoms in the alkyl alcohol chain; preferably, an average of 4 to 20 ethylene oxide units or an average of 1 to 8 propylene oxide units are present.

The surfactant(s) in the antistatic solution is selected in particular from the group comprising ethoxylated alkylphenols, ethoxylated/propoxylated alkylphenols, ethoxylated alkylphenols with end group capping and ethoxylated/propoxylated alkylphenols with end group capping, it being possible for the alkyl group of the alkylphenols—saturated or unsaturated—to have an average number of carbon atoms ranging from 4 to 18, it being possible for the ethylene oxide chain to have an average of 2 to 30 ethylene oxide units, it being possible for the propylene oxide chain to have an average of 1 to 25 propylene oxide units, and it being possible for end group capping to be present in the form of an alkyl group having an average of 1 to 8 carbon atoms. Preferably, the alkylphenol chain has an average of 10 to 14 carbon atoms; preferably, an average of 4 to 20 ethylene oxide units and/or an average of 1 to 8 propylene oxide units are present.

The surfactant(s) in the antistatic solution can be selected from ethoxylated alkylamines whose alkyl radical—saturated or unsaturated—has an average number of carbon atoms ranging from 6 to 22 and a linear or branched chain structure, and whose polyethylene oxide chain has an average number of ethylene oxide units ranging from 3 to 30, and/or whose average number of propylene oxide units ranges from 1 to 25. Such fatty amine compounds can additionally have end group capping.

The surfactant(s) in the antistatic solution can also be selected from the group comprising ethoxylated or ethoxylated/propoxylated alkanoic acids, ethoxylated or ethoxylated/propoxylated fatty acids and/or other ethoxylated or ethoxylated/propoxylated organic acids such as terpene acids, e.g. abietic acid, whose alkyl radical—saturated, unsaturated and/or cyclic—has an average number of carbon atoms ranging from 6 to 22 and a linear or branched chain structure, and whose polyethylene oxide chain has an average number of ethylene oxide units ranging from 2 to 30, and/or whose average number of propylene oxide units ranges from 1 to 25.

The surfactant(s) in the antistatic solution can furthermore be selected from the group comprising block copolymers containing at least one polyethylene oxide block and at least one polypropylene oxide block, it being possible for their polyethylene oxide block to comprise an average of 2 to 100 ethylene oxide units and for their polypropylene oxide block to comprise an average of 2 to 100 propylene oxide units, and it being possible for the molecule to contain one or more polyethylene oxide blocks or polypropylene oxide blocks independently of one another.

The surfactant(s) in the antistatic solution can moreover be selected from the group comprising alkyl polyglucosides whose alkyl group—saturated or unsaturated—has an average number of carbon atoms ranging from 4 to 18 and either a linear or a branched chain structure, and has an average of 1 to 5 units of at least one sugar, it being possible for the units of the sugar(s) to be glucosidically linked to the alkyl group. The term "sugar" is understood to include all saccharides and all other sugar-like compounds.

The surfactant(s) in the antistatic solution can furthermore be selected from the group comprising anionic surfactants whose alkyl group—saturated or unsaturated—can have an average number of carbon atoms ranging from 6 to 22 and either a linear or a branched chain structure, it being possible for the alkyl moiety optionally to have one or more aromatic groups, and there being at least one sulfate or sulfonate group present in the molecule. The alkyl alcohol chain preferably has an average of 10 to 14 carbon atoms; benzene is preferably incorporated as the aromatic group.

The surfactant(s) in the antistatic solution can additionally be selected from the group comprising ether sulfates whose ethoxylated alkyl alcohols or ethoxylated/propoxylated alkyl alcohols have a sulfate group, it being possible for the alkyl group of the alkyl alcohols—saturated or unsaturated—to have an average number of carbon atoms ranging from 6 to 22 and either a linear or a branched chain structure, it being possible for the ethylene oxide chain to have an average of 2 to 30 ethylene oxide units, it optionally being possible for the propylene oxide chain to have an average of 1 to 25 propylene oxide units, and it being possible for the alkyl moiety optionally to have one or more aromatic and/or phenolic groups. Preferably, the alkyl alcohol chain has an average of 10 to 14 carbon atoms; preferably, there are an average of 4 to 20 ethylene oxide units and/or an average of 1 to 8 propylene oxide units.

The surfactant(s) in the antistatic solution can further be selected from the group comprising ether phosphates whose ethoxylated alkyl alcohols or ethoxylated/propoxylated alkyl alcohols have a phosphate group, it being possible for the alkyl group of the alkyl alcohols—saturated or unsaturated—to have an average number of carbon atoms ranging from 6 to 22 and either a linear or a branched chain structure, it being possible for the ethylene oxide chain to have an average of 2 to 30 ethylene oxide units, it optionally being possible for the propylene oxide chain to have an average of 1 to 25 propylene oxide units, and it being possible for the alkyl moiety optionally to have one or more aromatic and/or phenolic groups. Preferably, the alkyl alcohol chain has an average of 10 to 16 carbon atoms; preferably, the ethylene oxide chain has an average of 4 to 20 ethylene oxide units; preferably, an average of 1 to 8 propylene oxide units are present.

Finally, the surfactant(s) in the antistatic solution can be selected from the group comprising phosphate esters whose one or two alkyl groups—saturated or unsaturated—independently of one another can have an average number of carbon atoms ranging from 4 to 16 and either a linear or a branched chain structure, it being possible for the alkyl moiety optionally to have one or more aromatic and/or phenolic groups, and there being one phosphate group present in the molecule.

Particularly preferably, the antistatic solution contains a combination of at least two surfactants:

selected from the groups comprising ethoxylated alkyl alcohols and ethoxylated/propoxylated alkyl alcohols;

selected from the groups comprising ethoxylated alkyl alcohols and ethoxylated alkyl alcohols with end group capping;

selected from the groups comprising ethoxylated alkyl alcohols and ethoxylated/propoxylated alkyl alcohols with end group capping;

selected from the groups comprising ethoxylated/propoxylated alkyl alcohols and ethoxylated alkyl alcohols with end group capping;

selected from the groups comprising ethoxylated/propoxylated alkyl alcohols and ethoxylated/propoxylated alkyl alcohols with end group capping;

selected from the groups comprising ethoxylated alkyl alcohols with end group capping and ethoxylated/propoxylated alkyl alcohols with end group capping;

selected from the groups comprising on the one hand ethoxylated alkyl alcohols, ethoxylated/propoxylated alkyl alcohols, ethoxylated alkyl alcohols with end group capping and ethoxylated/propoxylated alkyl alcohols with end group capping, and on the other hand block copolymers;

selected from the groups comprising on the one hand ethoxylated alkyl alcohols, ethoxylated/propoxylated alkyl alcohols, ethoxylated alkyl alcohols with end group capping, ethoxylated/propoxylated alkyl alcohols with end group capping and block copolymers, and on the other hand ethoxylated alkylphenols, ethoxylated/propoxylated alkylphenols, ethoxylated alkylphenols with end group capping and ethoxylated/propoxylated alkylphenols with end group capping;

selected from the groups comprising on the one hand ethoxylated alkyl alcohols, ethoxylated/propoxylated alkyl alcohols, ethoxylated alkyl alcohols with end group capping, ethoxylated/propoxylated alkyl alcohols with end group capping, block copolymers, ethoxylated alkylphenols, ethoxylated/propoxylated alkylphenols, ethoxylated alkylphenols with end group capping and ethoxylated/propoxylated alkylphenols with end group capping, and on the other hand ethoxylated alkylamines optionally with end group capping;

selected from the groups comprising on the one hand ethoxylated alkyl alcohols, ethoxylated/propoxylated alkyl alcohols, ethoxylated alkyl alcohols with end group capping, ethoxylated/propoxylated alkyl alcohols with end group capping, block copolymers, ethoxylated alkylphenols, ethoxylated/propoxylated alkylphenols, ethoxylated alkylphenols with end group capping, ethoxylated/propoxylated alkylphenols with end group capping and ethoxylated alkylamines optionally with end group capping, and on the other hand ethoxylated alkanoic acids, ethoxylated/propoxylated alkanoic acids and other ethoxylated organic acids;

selected from the groups comprising on the one hand ethoxylated alkyl alcohols, ethoxylated/propoxylated alkyl alcohols, ethoxylated alkyl alcohols with end group capping, ethoxylated/propoxylated alkyl alcohols with end group capping, block copolymers, ethoxylated alkylphenols, ethoxylated/propoxylated alkylphenols, ethoxylated alkylphenols with end group capping, ethoxylated/propoxylated alkylphenols with end group capping, ethoxylated alkylamines optionally with end group capping, ethoxylated alkanoic acids, ethoxylated/propoxylated alkanoic acids and other ethoxylated organic acids, and on the other hand alkyl polyglucosides; or selected from the groups comprising on the one hand ethoxylated alkyl alcohols, ethoxylated/propoxylated alkyl alcohols, ethoxylated alkyl alcohols with end group capping, ethoxylated/propoxylated alkyl alcohols with end group capping, block copolymers, ethoxylated alkylphenols, ethoxylated/propoxylated alkylphenols, ethoxylated alkylphenols with end group capping, ethoxylated/propoxylated alkylphenols with end group capping, ethoxylated alkylamines optionally with end group capping, ethoxylated alkanoic acids, ethoxylated/propoxylated alkanoic acids, other ethoxylated organic acids and alkyl polyglucosides, and on the other hand ether sulfates.

At least one solubilizer, e.g. a cumenesulfonate or a glycol, especially dipropylene glycol, a biocide, a fungicide and/or a pH adjuster, e.g. an amine or an organic acid, could also be added to the antistatic solution. It has been found that, apart from the above-mentioned surface-active ingredients as constituents of the antistatic solution according to the invention, substances selected from the groups comprising polyglycols, polyacrylamides and modified polyacrylamides are also suitable for this purpose, optionally as components of the antistatic solution.

The organic solvent(s) are advantageously selected from water-miscible solvents and, if appropriate, have a DIN 53170 relative evaporation rate ranging from 1 to 25. The relative evaporation rate is the quotient of the evaporation time of the test liquid and that of diethyl ether as reference liquid at approx. 293 K and a relative humidity of approx. 65%. The organic solvents are selected in particular from the group comprising acetone, ethanol, methanol, 1-propanol, 2-propanol, tertiary butanol, pyrrolidone, dioxane and solvent mixtures containing at least one such organic solvent. 1- or 2-propanol, or mixtures of at least one of these organic solvents with 1- and/or 2-propanol, are particularly preferred. Moreover, these solvents or solvent mixtures must not dissolve or swell the plastic and/or lacquer surface used. It is advisable for the water used to be preferably fully demineralized.

The moulding antistatically coated according to the invention preferably consists substantially or partially of at least one plastic and/or lacquer and/or is at least partially coated with at least one plastic and/or lacquer or with a film consisting substantially of plastic, it being possible for the plastic to be selected from the group comprising engineering thermoplastics, elastomers or duromers, e.g. polypropylene (PP), polyamide (PA), polycarbonate (PC), polystyrene (PS), acrylonitrile/butadiene/styrene polymers (ABS), polyvinyl chloride (PVC), polymethyl methacrylate (PMMA), thermoplastic polyurethanes and polyurethane integral foams (PUR), SMC/BMC resins and resin systems, and blends thereof, e.g. PC-PBT (polycarbonate/polybutylene terephthalate) or PP-EPDM (polypropylene/ethylene-propylene/diene monomer), and/or composite materials having a matrix of at least one of the above-mentioned polymers with high-strength and/or high-rigidity reinforcing fibres, e.g. fibres made of glass, polyamide, chain silicate, e.g. wollastonite, or carbon. The antistatically coated moulding can also consist substantially of a fully coloured plastic.

The antistatically coated moulding can also be lacquered, the lacquer preferably being selected from the group comprising those based on 2C polyester/isocyanate, 2C acrylic/isocyanate, 2C epoxide/amine, 2C unsaturated polyester/peroxide, 1C acrylic resin, 1C polyurethane resin, 1C alkyd resin, 1C PVC resin, 1C polyester/melamine, 1C acrylic dispersions, 1C PUR dispersions, 1C water-soluble polyester/melamine and 1C unsaturated radiation-curing binder. It can also subsequently be lacquered once again with at least one lacquer preferably selected from those in the above groups.

In accordance with the process according to the invention, a polymer coating, e.g. a film and/or a varnish, such as a topcoat, can also be applied to the clean plastic and/or lacquer surface.

The antistatic film can be applied automatically to the moulding surface to be coated, especially by spraying with or dipping into the antistatic solution, or it can be applied manually, e.g. with a lint-free material soaked with the antistatic solution, and especially with crepe or udder paper.

The proportion of organic solvent(s) in the antistatic solution can be preferably at least 35 wt. %, particularly preferably at least 50 wt. % and very particularly preferably at least 60 wt. %. However, the proportion of organic solvent(s) can also be at least 70 wt. %, or at least 85 wt. % or even at least 95 wt. %. In many cases the content of organic solvent(s) will preferably range from 55 to 80 wt. %. This content will advantageously be adapted to the application technology and to the industrial safety and hygiene conditions.

A particularly effective composition has been found which consists substantially of an aqueous and especially alcoholic solution containing at least 20 wt. %, preferably at least 30 wt. % and especially not more than 90 wt. % of an organic solvent or organic solvent mixture, and containing a fatty amine ethoxylate of the general structural formula

R being an alkyl chain having 6 to 22 carbon atoms, preferably 10 to 14 carbon atoms, and especially a linear alkyl chain, x having values preferably of 3 to 20 and particularly preferably of 4 to 10, and y having values preferably of 3 to 20 and particularly preferably of 4 to 10, in combination with a content of at least one other nonionic surfactant, e.g. an ethoxylated or ethoxylated/propoxylated fatty alcohol of the general structural formula

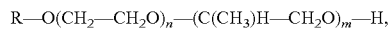

R—O(CH$_2$—CH$_2$O)$_n$—(C(CH$_3$)H—CH$_2$O)$_m$—H,

R being an alkyl chain having 6 to 22 carbon atoms, preferably 10 to 14 carbon atoms, and especially a linear alkyl chain, n being the number of ethylene oxide units and having values preferably of 3 to 20 and particularly preferably of 4 to 10, and m being the number of propylene oxide units and having values preferably of 0 to 15 and particularly preferably of 0 to 8.

The content of surfactants from the individual surfactant groups preferably ranges from 0.005 to 0.1 wt. % and particularly preferably from 0.01 to 0.05 wt. %. The total surfactant content preferably ranges from 0.01 to 0.5 wt. % and especially from 0.03 to 0.1 wt. %. Preferred solvents, which can be added to the water individually or in a mixture, are ethanol, 1-propanol and 2-propanol.

The process according to the invention uses preferably a combination of at least two surfactants and particularly preferably a combination of at least one ethoxylated alkylamine with at least one ethoxylated or ethoxylated/propoxylated fatty alcohol in a weight ratio ranging from 9:1 to 1:9 and preferably from 2:1 to 1:3. Alternatively, surfactants selected especially from the groups comprising ethoxylated or ethoxylated/propoxylated alkyl alcohols with or without end group capping, ethoxylated or ethoxylated/propoxylated alkylphenols with or without end group capping, ethoxylated or ethoxylated/propoxylated alkylamines, block copolymers, ether sulfates, ether phosphates and phosphate esters can represent the major part (at least 65 wt. %) of the surfactant mixture.

It has been found that the ethoxylated alkylamines used for the application in combination with at least one ethoxylated or ethoxylated/propoxylated alkyl alcohol are particularly favourable for adjusting the foaming tendency to a low level. The foaming behaviour or foaming compatibility of the process according to the invention also refers here to the compatibility of the applied antistatic solution with the wash water used in the subsequent powerwash process.

It has further been found that the part of the surfactant film washed off e.g. in the powerwash process, i.e. the part of the surface-active substances not remaining on the plastic or lacquer surface in the powerwash process, may be at most 0.3 g/l, preferably at most 0.2 g/l and especially at most 0.1 g/l of wash water in order not to have an adverse effect on the properties—especially the foaming behaviour—of the powerwash process.

It has moreover been found that, for manual application under normal conditions (i.e. with the object at room temperature), and with a proportion of surfactant ranging from 0.01 to 0.5 wt. %, a proportion of organic solvent(s) of at least 40 wt. % and preferably of 45 to 85 wt. % is favourable for ensuring that the application is uniform, the coating of the surface with a surfactant film is uniform and the drying is effected by sensible heat. The favourable amounts of antistatic solution applied or consumed for this purpose have been found to range from 10 to 40 ml/m$^2$ and especially from 20 to 30 ml/m$^2$ of plastic and/or lacquer surface.

It has furthermore been found that, for automatic application of the antistatic solution by means of nozzles or spraying under a pressure ranging from 0.5 to 15 bar using the application devices suitable for the purpose, the amount consumed can be reduced, compared with manual application, to 5 to 20 ml/m$^2$ and especially to 10 to 15 ml/m$^2$ of plastic and/or lacquer surface.

Decisive factors governing the suitability of the process according to the invention, apart from the antistatic and hence protective property of the plastic and/or lacquer surface, are the application possibilities such as simple and straightforward application of the antistatic solution and, substantially, compatibility with the aqueous cleaning following the production and processing steps, especially in the powerwash process.

The process according to the invention is outstandingly suitable for both manual and automated application to plastic and/or lacquer surfaces.

The process according to the invention also has the advantage that the chosen combination of raw materials can be removed in the subsequent powerwash process to the extent that no interfering residues remain and that the residual thin surfactant films on the moulding surface do not cause interfering changes, do not interfere with any subsequent lacquering process and do not have an adverse effect on the lacquer adhesion properties of the finished plastic moulding or the plastic and/or lacquer coating.

Compared with the processes described and practised hitherto, the process according to the invention for the antistatic coating of plastic and/or lacquer surfaces has the advantage that it can easily be automated, that it can easily be integrated into the processing steps of existing plastic moulding manufacturing operations, that it is a very cost-effective process, that it helps easily to avoid all the disadvantages listed in the introduction to the description of the present invention as regards the avoidance or removal of electrostatically adhering dust or dirt, that the surfactant content of the antistatic solution can be kept comparatively low, and that the surfactants originating from the antistatic solution are easily washed off the plastic or lacquer surfaces in the powerwash process, remain in the wash water used in the powerwash process and then themselves act as cleaning components in the powerwash process. The plastic or lacquer surfaces cleaned in this way are outstandingly suitable for the subsequent lacquering process. The process according to the invention is suitable in principle for all plastic or lacquer surfaces.

It was surprising that the surfactant content of the antistatic solution could be kept extremely low compared with the use of polyglycols or polyacrylamides in an antistatic solution.

Surfactants as antistatic agents have the additional advantages that they wet a plastic surface markedly better than electrically conductive polymers and that, in contrast to electrically conductive polymers, they always leave behind a hydrophilic surface which binds water and hence is electrically conductive.

The process according to the invention can be used inter alia for treated plastic and/or lacquer surfaces, especially in the automotive industry and automotive component supply industry, for railway vehicles, for the aeronautical and space industry, for electrical engineering, electronics, domestic appliances, panelling, cladding elements, housings and clocks, for the building industry, for the furniture industry, in apparatus and machine engineering, in plastics manufacturing sectors or in sectors where plastic and/or lacquer surfaces are machined e.g. by drilling, deburring, milling, grinding or polishing. The products antistatically coated by the process according to the invention can be used in particular as housings and panelling, especially in motor vehicle construction.

EXAMPLES

The subject-matter of the invention is illustrated in greater detail below with the aid of Examples.

The application experiments were carried out on injection mouldings of a plastic blend with a high thermoplastic polyester content, frequently used in the automotive sector. To determine the antistatic protective action, alcoholic solutions containing surfactant were applied manually to the plastic surfaces by means of lint-free crepe paper. The mouldings antistatically coated by the process according to the invention were stored for several weeks in places with a high air and dust circulation, e.g. storage rooms, underground car parks or laboratory hoods, and then assessed for the covering of dust particles on them.

This was done both by means of a percentage evaluation of the area covered and by means of a quantitative determination of the deposited particulates capable of being wiped off.

A large number of antistatic solutions were prepared and a large number of antistatically coated plastic mouldings were exposed to dust. A selection is listed in Table 2. The dust data were averaged over a large number of mouldings and over the whole of their antistatically treated surface.

The solutions were prepared in technical-grade isopropanol using the following surfactants:

A: ethoxylated alcohol having approx. 12 carbon atoms and approx. 5 ethylene oxide units
B: ethoxylated/propoxylated alcohol having approx. 12 carbon atoms, approx. 8 ethylene oxide units and approx. 13 propylene oxide units
C: ethoxylated alcohol with n-butyl end group capping having approx. 10 carbon atoms and approx. 4 ethylene oxide units
D: quaternary ammonium compound with dodecyltrimethylammonium bromide
E: modified cationic polyacrylamide
F: polyethylene glycol with a molecular weight of approx. 400
G: ethoxylated alkylamine having approx. 12 carbon atoms and approx. 9 ethylene oxide units
H: ether phosphate having an octylphenol group and 4 ethylene oxide units The antistatic solutions were applied manually at room temperature with lint-free crepe paper, the application being extensively reproducible.

TABLE 2

Antistatic solutions tested and dust covering on the coated mouldings based on a polycarbonate/polyethylene terephthalate blend:

| Example | Solvent content (wt. %) | Surfactant content (wt. %) | Type of surfactant | Covering of dust particles (area %) |
|---|---|---|---|---|
| E 1 | 99.5 | 0.5 | D | 0[1] |
| E 2 | 99.0 | 1.0 | D | 0[1] |
| E 3 | 98.5 | 1.5 | D | 0[1] |
| E 4 | 60.0 | 0.1 | G | 0 |
| E 5 | 60.0 | 0.1 | G | 0 |
| CE 6 | 60.0 | 0.1 | D | 20 |
| CE 7 | 60.0 | 0.05 | D | 30-40 |
| E 8 | 60.0 | 0.1 | F | 10 |
| E 9 | 60.0 | 0.01 | E | 10 |
| E 10 | 60.0 | 0.1 | A | 0 |
| E 11 | 60.0 | 0.1 | H | 0 |
| E 12 | 50.0 | 0.02 | B | 0[2] |
| E 13 | 50.0 | 0.05 | B | 0[2] |
| E 14 | 50.0 | 0.12 | B | 0[2] |
| E 15 | 50.0 | 0.02 | C | 0[2] |
| E 16 | 50.0 | 0.05 | C | 0[2] |
| E 17 | 50.0 | 0.12 | C | 0[2] |
| E 18 | 60.0 | 0.05 | B, C, G | 0 |
| E 19 | 60.0 | 0.10 | B, C, G | 0 |
| E 20 | 60.0 | 0.20 | B, C, G | 0 |

In some of the Examples identified by [1], a partial covering of dust particles of <1% occurred due to an imperfectly uniform manual application. The measured covering of dust particles was even more markedly reduced when using a higher active ingredient concentration of the same surfactants.

Again, in some of the Examples identified by [2], a partial covering of dust particles of <1% was determined due to an imperfectly uniform manual application, but the covering of dust particles was found not to be concentration-dependent.

The experiments with a cleaning solution intended to simulate the cleaning solution in the powerwash process were carried out with an aqueous acidic solution devoid of added organic solvent (E 21). The standard cleaning solution contained one surfactant from each of categories B and C. In identical experiments the effect of a proportion of dried-on surfactants from the antistatic solution, which entered the cleaning solution, was measured (E 22 et seq.). These additional surfactant components and their effect on the foaming behaviour are shown in Table 3. The foaming behaviour of surfactants was determined in a foam measuring apparatus in which the cleaning solution is sprayed against a glass wall under precisely stipulated conditions, i.e. at 60° C. and under a pressure of 1.5 bar, and then falls onto the bath surface. The foaming behaviour was determined by the foam height in cm after a period of 30 minutes on the bath surface in a flask as the moving zone, compared with that on the bath surface in a glass tube immersed in the bath solution as the stationary zone.

The standard cleaning solution contained one surfactant from each of categories B and C selected from the group comprising ethoxylated alkyl alcohols with end group capping and ethoxylated/propoxylated alkyl alcohols, it being possible for the alkyl group of the alcohols to have an average number of carbon atoms ranging from 6 to 14.

TABLE 3

Foaming behaviour of the cleaning solution as can occur in the powerwash process in combination with an antistatic solution

| Example | Cleaning component (wt. %) | Surfactant content (wt. %) | Type of surfactant | Foam height (cm) |
|---|---|---|---|---|
| E 21 | 1.0 | 0.0 | * | 1[1] |
| CE 1 | 1.0 | 0.5 | D | 20 |
| CE 22 | 1.0 | 0.02 | D | 10 |
| CE 23 | 2.0 | 0.02 | D | 10 |
| CE 4/5 | 1.0 | 0.1 | G | 20 |
| CE 24 | 1.0 | 0.02 | G | 20 |

TABLE 3-continued

Foaming behaviour of the cleaning solution as can occur in the powerwash process in combination with an antistatic solution

| Example | Cleaning component (wt. %) | Surfactant content (wt. %) | Type of surfactant | Foam height (cm) |
|---|---|---|---|---|
| CE 25 | 2.0 | 0.02 | G | 12 |
| E 26 | 2.0 | 0.01 | G | 7 |
| E 27 | 2.0 | 0.005 | G | 3.5 |
| E 10 | 1.0 | 0.1 | A | 5 |
| E 28 | 1.0 | 0.02 | A | 3 |
| E 13 | 1.0 | 0.05 | B | 7 |
| E 12 | 1.0 | 0.02 | B | 3 |
| E 17 | 1.0 | 0.12 | C | 3 |
| E 15 | 1.0 | 0.02 | C | 1 |
| E 11 | 1.0 | 0.1 | H | 5 |
| E 29 | 1.0 | 0.02 | H | 2 |
| E 28 | 1.0 | 0.02 | C, G | 2.5 |
| E 29 | 1.0 | 0.04 | C, G | 5 |
| E 30 | 1.0 | 0.02 | A, D | 5 |
| E 31 | 2.0 | 0.02 | A, D | 3 |
| E 32 | 1.0 | 0.02 | B, C, G | 0 |
| E 33 | 1.5 | 0.02 | B, C, G | 0 |
| E 34 | 1.5 | 0.002 | B, C, G | 5[2)] |

*Standard cleaning solution, but the surfactants in the standard cleaning solution are not listed in greater detail in the Table.
[1)]Foaming behaviour of the acidic cleaner without surfactants from the antistatic solution
[2)]1:10 dilution (simulation of the 1st rinse); fully demineralized water, 40° C.

Without the antistatic coating according to the invention, plastic surfaces based on a polycarbonate/polyethylene terephthalate blend exhibited electrostatic charges ranging from 20 to 30 kV, whereas the electrical charge on the plastic surfaces antistatically coated according to the invention had values predominantly ranging from 10 to 150 V and rarely up to 500 V.

It was found that, in contrast to surfaces not treated according to the invention, the moulding surfaces treated in this way exhibited effective, almost 100% protection over a period of at least 4 weeks.

Experiments with surfactants A, B, C, D and G as individual surfactants in the antistatic solution, and experiments with combinations of surfactants A/D, C/G and B/C/G in the antistatic solution, were also very successful on automatic uniform application in respect of avoidance of an increased covering of dust particles and in respect of compatibility with the cleaning solution used in the powerwash process.

It is claimed:

1. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution consisting essentially of from 0.01 to 0.5 wt. % of at least one non-ionic surfactant, a second surfactant, at least 20 wt. % of at least one organic solvent containing at least one volatile constituent and water; wherein the at least one volatile constituent substantially to completely evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, and wherein the at least one non-ionic surfactant causes only very little to no foaming in a subsequent washing process.

2. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution consisting essentially of from 0.01 to 0.5 wt. % of at least one non-ionic surfactant, at least 20 wt. % of at least one organic solvent containing at least one volatile constituent, a second non-ionic surfactant and water; wherein the at least one volatile constituent substantially to completely evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the at least one non-ionic surfactant causes only very little to no foaming in a subsequent washing process.

3. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution consisting essentially of from 0.01 to 0.5 wt. % of at least one non-ionic surfactant, at least 20 wt. % of at least one organic solvent containing at least one volatile constituent and water; wherein the at least one volatile constituent substantially to completely evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the at least one non-ionic surfactant causes only very little to no foaming in a subsequent washing process; wherein
   the at least one non-ionic surfactant is similar or identical to at least one surfactant contained in an aqueous solution used when washing the surface.

4. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution consisting essentially of from 0.01 to 0.5 wt. % of at least one non-ionic surfactant, at least 20 wt. % of at least one organic solvent containing at least one volatile constituent and water; wherein the at least one volatile constituent substantially to completely evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the at least one non-ionic surfactant causes only very little to no foaming in a subsequent washing process,
   wherein at the antistatic solution contains a surfactant that is an ether phosphate.

5. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution consisting essentially of from 0.01 to 0.5 wt. % of at least one non-ionic surfactant, at least 20 wt. % of at least one organic solvent containing at least one volatile constituent and water; wherein the at least one volatile constituent substantially to completely evaporates from the surface to form the antistatic coating, wherein the antistatic coating substantially to completely prevents contamination of the plastic or lacquer surface due to electrostatic charging until the plastic or lacquer surface is cleaned or polarized, wherein the at least one non-ionic surfactant causes only very little to no foaming in a subsequent washing process, wherein the antistatic solution contains a surfactant that is a phosphate ester.

6. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution consisting essentially of from 0.01 to 0.5 wt. % of at least one non-ionic surfactant, at least 20 wt. % of at least one organic solvent containing at least one volatile constituent and water; wherein the at least one volatile constituent substantially to completely evaporates from the plastic or lacquer surface to form the antistatic coating, wherein the antistatic coating substantially to completely prevents contamination of the antistatic surface due to electrostatic charging until the plastic or lacquer surface is cleaned or polarized, wherein the at least one non-ionic surfactant causes only very little to no foaming in a subsequent washing process, wherein the antistatic solution contains at least one polyglycol, a polyacrylamide or a modified polyacrylamide.

7. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution consisting essentially of from 0.01 to 0.5 wt. % of at least one non-ionic surfactant, at least 20 wt. % of at least one organic solvent containing at least one volatile constituent and water; wherein the at least one volatile constituent substantially to completely evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the at least one non-ionic surfactant causes only very little to no foaming in a subsequent washing process, wherein the antistatic solution contains a fatty amine ethoxylate of the formula $H(OCH_2-CH_2)_x-RN-(CH_2-CH_2O)_yH$,
wherein R is an alkyl chain having 6 to 22 carbon atoms,
x is from 3 to 20, and
y is from 3 to 20.

8. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution consisting essentially of from 0.01 to 0.5 wt. % of at least one non-ionic surfactant, at least 20 wt. % of at least one organic solvent containing at least one volatile constituent, an additional non-ionic surfactant, an ethoxylated or ethoxylated/propoxylated fatty alcohol of the formula $R-O(CH_2-CH_2O)_n-(C(CH_3)H-CH_2O)_m-H$, wherein R is an alkyl chain having 6 to 22 carbon atoms, n is the number of ethylene oxide units and ranges from 3 to 20 and m is the number of propylene oxide units and has ranges from 0 to 15 and water; wherein the at least one volatile constituent substantially to completely evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the at least one non-ionic surfactant causes only very little to no foaming in a subsequent washing process.

9. An automated process comprising providing an antistatic coating on a plastic or lacquer surface after finishing and before polarization by applying an antistatic coating to the plastic or lacquer surface by contacting the plastic or lacquer surface with a solution consisting essentially of from 0.01 to 0.5 wt. % of at least one non-ionic surfactant, at least 20 wt. % of at least one organic solvent containing at least one volatile constituent, and water; wherein the at least one volatile constituent substantially to completely evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the antistatic solution contains a combination of at least two surfactants, wherein said combination comprises a) at least one ethoxylated alkylamine and b) at least one of an ethoxylated alcohol or an ethoxylated/propoxylated fatty alcohol, wherein the weight ratio of a) to b) ranges from 9:1 to 1:9.

10. An automated process comprising providing an antistatic coating on a plastic or lacquer surface after finishing and before polarization by applying an antistatic coating to a plastic or lacquer surface by contacting the plastic or lacquer surface with a solution comprising from 0.01 to 0.5 wt. % of at least one non-ionic surfactant, at least 20 wt. % of at least one organic solvent containing at least one volatile constituent, and water; wherein the at least one volatile constituent substantially to completely evaporates from the plastic or lacquer surface to form the antistatic coating, wherein the antistatic coating substantially or completely prevents contamination of the plastic or lacquer surface due to electrostatic charging until the antistatic surface is cleaned or polarized, wherein the antistatic solution consists essentially of a surfactant mixture comprising an ethoxylated alkyl alcohol, an ethoxylated/propoxylated alkyl alcohol, an ethoxylated alkylphenol, an ethoxylated alkylamine, an ethoxylated/propoxylated alkylamine, a block copolymer, an ether sulfate, an ether phosphate or a phosphate ester.

11. An automated process comprising providing an antistatic coating on a plastic or lacquer surface after finishing and before polarization by applying an antistatic coating to a plastic or lacquer surface by contacting the plastic or lacquer surface with a solution consisting essentially of from 0.01 to 0.5 wt. % of at least one non-ionic surfactant, at least 20 wt. % of at least one organic solvent containing at least one volatile constituent, and water; wherein the at least one volatile constituent substantially to completely evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the antistatic solution contains an ethoxylated alkylamine and an ethoxylated alkyl alcohol.

12. An automated process comprising providing an antistatic coating on a plastic or lacquer surface after finishing and before polarization by applying an antistatic coating to a plastic or lacquer surface by contacting the plastic or lacquer surface with a solution consisting essentially of from 0.01 to 0.5 wt. % of at least one non-ionic surfactant, at least 20 wt. % of at least one organic solvent containing at least one volatile constituent, and water; wherein the at least one volatile constituent substantially to completely evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein at least one polyglycol, a polyacrylamide or a modified polyacrylamide are added to the antistatic solution.

13. An automated process comprising providing an antistatic coating on a plastic or lacquer surface after finishing and before polarization by applying an antistatic coating to a plastic or lacquer surface by contacting the plastic or lacquer surface with a solution consisting essentially of from 0.01 to 0.5 wt. % of at least one non-ionic surfactant, at least 20 wt. % of at least one organic solvent containing at least one volatile constituent, and water; wherein the at least one volatile constituent substantially to completely evaporates from the plastic or lacquer surface to form the antistatic coating, wherein the antistatic coating substantially to completely prevents contamination of the plastic of lacquer surface due to electrostatic charging until the plastic or lacquer surface is cleaned or polarized, wherein the antistatic solution comprises an aqueous alcoholic solution containing at least 20 wt. % of an organic solvent or organic solvent mixture, and containing a fatty amine ethoxylate of the general structural formula $H(OCH_2-CH_2)_x-RN-(CH_2-CH_2O)_yH$, wherein R is an alkyl chain having 6 to 22 carbon atoms, x is from 3 to 20 and y is from 3 to 20.

14. An automated process comprising providing an antistatic coating on a plastic or lacquer surface after finishing and before polarization by applying an antistatic coating to a plastic or lacquer surface by contacting the plastic or lacquer surface with a solution consisting essentially of from 0.01 to 0.5 wt. % of at least one non-ionic surfactant, at least 20 wt. % of at least one organic solvent containing at least one volatile constituent, and water; wherein the at least one volatile constituent substantially to completely evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the antistatic solution also contains another non-ionic surfactant of the formula $R-O(CH_2-CH_2O)_n-C(CH_3)H-CH_2O)_m-H$, wherein R is an alkyl chain having 6 to 22 carbon atoms, n is the number of ethylene oxide units and ranges from 3 to 20 and m is the number of propylene oxide units and is 1.

15. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution from 0.01 to 0.5 wt. % of at least one non-ionic surfactant, a second surfactant, at least 20 wt. % of at least one organic solvent containing at least one volatile constituent and water; wherein the at least one volatile constituent completely evaporates from the plastic or lacquer surface to form the antistatic coating, wherein the coating substantially to completely prevents contamination of the plastic or lacquer surface due to electrostatic charging until the plastic or lacquer surface is cleaned or polarized, wherein the at least one non-ionic surfactant causes only very little to no foaming in a subsequent washing process;
  wherein the at least one non-ionic surfactant causes only very little to no foaming in a subsequent washing process.

16. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution comprising from 0.01 to 0.5 wt. % of at least one non-ionic surfactant, at least 20 wt. % of at least one organic solvent containing at least one volatile constituent, a second non-ionic surfactant and water; wherein the at least one volatile constituent substantially evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the at least one non-ionic surfactant causes only very little to no foaming in a subsequent washing process; wherein the antistatic solution.

17. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution comprising from 0.01 to 0.5 wt. % of at least one non-ionic surfactant, at least 20 wt. % of at least one organic solvent containing at least one volatile constituent and water; wherein the at least one volatile constituent completely evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the at least one non-ionic surfactant causes only very little to no foaming in a subsequent washing process; wherein
  the at least one non-ionic surfactant is similar or identical to at least one surfactant contained in an aqueous solution used when washing the surface.

18. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution comprising from 0.01 to 0.5 wt. % of at least one non-ionic surfactant, at least 20 wt. % of at least one organic solvent containing at least one volatile constituent and water; wherein the at least one volatile constituent substantially to completely evaporates from the plastic or lacquer surface to form the antistatic coating, wherein the antistatic coating completely prevents contamination of the plastic or lacquer surface due to electrostatic charging until the plastic or lacquer surface is cleaned or polarized, wherein the at least one non-ionic surfactant causes only very little to no foaming in a subsequent washing process,
  wherein at the antistatic solution contains a surfactant that is an ether phosphate.

19. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution comprising from 0.01 to 0.5 wt. % of at least one non-ionic surfactant, at least 20 wt. % of at least one organic solvent containing at least one volatile constituent and water; wherein the at least one volatile constituent completely evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the at least one non-ionic surfactant causes only very little to no foaming in a subsequent washing process,
   wherein the antistatic solution contains a surfactant that is a phosphate ester.

20. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic comprising from 0.01 to 0.5 wt. % of at least one non-ionic surfactant, at least 20 wt. % of at least one organic solvent containing at least one volatile constituent and water; wherein the at least one volatile constituent substantially to completely evaporates from the plastic or lacquer surface to form the antistatic coating, wherein the antistatic coating completely prevents contamination of the plastic or lacquer surface due to electrostatic charging until the plastic or lacquer surface is cleaned or polarized, wherein the at least one non-ionic surfactant causes only very little foaming in a subsequent washing process,
   wherein the antistatic solution contains at least one polyglycol, a polyacrylamide or a modified polyacrylamide.

21. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution comprising from 0.01 to 0.5 wt. % of at least one non-ionic surfactant, at least 20 wt. % of at least one organic solvent containing at least one volatile constituent and water; wherein the at least one volatile constituent completely evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the at least one non-ionic surfactant causes only very little to no foaming in a subsequent washing process,
   wherein the antistatic solution contains a fatty amine ethoxylate of the formula $H(OCH_2-CH_2)_x-RN-(CH_2-CH_2O)_yH$,
   wherein R is an alkyl chain having 6 to 22 carbon atoms,
   x is from 3 to 20, and
   y is from 3 to 20.

22. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution comprising from 0.01 to 0.5 wt. % of at least one non-ionic surfactant, at least 20 wt. % of at least one organic solvent containing at least one volatile constituent, an additional non-ionic surfactant, an ethoxylated or ethoxylated/propoxylated fatty alcohol of the formula $R-O(CH_2-CH_2O)_n-(C(CH_3)H-CH_2O)_m-H$, wherein R is an alkyl chain having 6 to 22 carbon atoms, n is the number of ethylene oxide units and ranges from 3 to 20 and m is the number of propylene oxide units and has ranges from 0 to 15 and water; wherein the at least one volatile constituent completely evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the at least one non-ionic surfactant causes only very little to no foaming in a subsequent washing process.

23. An automated process comprising providing an antistatic coating on a plastic or lacquer surface after finishing and before polarization by applying an antistatic coating to the plastic or lacquer surface by contacting the plastic or lacquer surface with a solution comprising from 0.01 to 0.5 wt. % of at least one non-ionic surfactant, at least 20 wt. % of at least one organic solvent containing at least one volatile constituent, and water; wherein the at least one volatile constituent substantially to completely evaporates from the plastic or lacquer surface to form the antistatic coating, wherein the antistatic coating completely prevents contamination of the plastic or lacquer surface due to electrostatic charging until the plastic or lacquer surface is cleaned or polarized, wherein the antistatic solution contains a combination of at least two surfactants, wherein said combination comprises a) at least one ethoxylated alkylamine and b) at least one of an ethoxylated alcohol or an ethoxylated/propoxylated fatty alcohol, wherein the weight ratio of a) to b) ranges from 9:1 to 1:9.

24. An automated process comprising providing an antistatic coating on a plastic or lacquer surface after finishing and before polarization by applying an antistatic coating to a plastic or lacquer surface by contacting the plastic or lacquer surface with a solution comprising from 0.01 to 0.5 wt. % of at least one non-ionic surfactant, at least 20 wt. % of at least one organic solvent containing at least one volatile constituent, and water; wherein the at least one volatile constituent completely evaporates from the plastic or lacquer surface to form the antistatic coating, wherein the antistatic coating substantially or completely prevents contamination of the plastic or lacquer surface due to electrostatic charging until the plastic or lacquer surface is cleaned or polarized, wherein the antistatic solution consists of a surfactant mixture comprising an ethoxylated alkyl alcohol, an ethoxylated/propoxylated alkyl alcohol, an ethoxylated alkylphenol, an ethoxylated alkylamine, an ethoxylated/propoxylated alkylamine, a block copolymer, an ether sulfate, an ether phosphate or a phosphate ester.

25. An automated process comprising providing an antistatic coating on a plastic or lacquer surface after finishing and before polarization by applying an antistatic coating to a plastic or lacquer surface by contacting the plastic or lacquer surface with a solution comprising from 0.01 to 0.5 wt. % of at least one non-ionic surfactant, at least 20 wt. % of at least one organic solvent containing at least one volatile constituent, and water; wherein the at least one volatile constituent completely evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the antistatic solution contains an ethoxylated alkylamine and an ethoxylated alkyl alcohol.

26. An automated process comprising providing an antistatic coating on a plastic or lacquer surface after finishing and before polarization by applying an antistatic coating to a plastic or lacquer surface by contacting the plastic or lacquer surface with a solution comprising from 0.01 to 0.5 wt. % of at least one non-ionic surfactant, at least 20 wt. % of at least one organic solvent containing at least one volatile constituent, and water; wherein the at least one volatile constituent completely evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein at least one polyglycol, a polyacrylamide or a modified polyacrylamide are added to the antistatic solution.

27. An automated process comprising providing an antistatic coating on a plastic or lacquer surface after finishing and before polarization by applying an antistatic coating to a plastic or lacquer surface by contacting the plastic or lacquer surface with a solution comprising from 0.01 to 0.5 wt. % of at least one non-ionic surfactant, at least 20 wt. % of at least one organic solvent containing at least one volatile constituent, and water; wherein the at least one volatile constituent completely evaporates from the plastic or lacquer surface to form the antistatic coating, wherein the antistatic coating substantially to completely prevents contamination of the plastic of lacquer surface due to electrostatic charging until the plastic or lacquer surface is cleaned or polarized, wherein the antistatic solution comprises an aqueous alcoholic solution containing at least 20 wt. % of an organic solvent or organic solvent mixture, and containing a fatty amine ethoxylate of the general structural formula $H(OCH_2-CH_2)_x-RN-(CH_2-CH_2O)_yH$, wherein R is an alkyl chain having 6 to 22 carbon atoms, x is from 3 to 20 and y is from 3 to 20.

28. An automated process comprising providing an antistatic coating on a plastic or lacquer surface after finishing and before polarization by applying an antistatic coating to a plastic or lacquer surface by contacting the plastic or lacquer surface with a solution comprising from 0.01 to 0.5 wt. % of at least one non-ionic surfactant, at least 20 wt. % of at least one organic solvent containing at least one volatile constituent, and water; wherein the at least one volatile constituent completely evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the antistatic solution also contains another non-ionic surfactant of the formula $R-O(CH_2-CH_2O)_n-(C(CH_3)H-CH_2O)_m-H$, wherein R is an alkyl chain having 6 to 22 carbon atoms, n is the number of ethylene oxide units and ranges from 3 to 20 and m is the number of propylene oxide units and is 1.

29. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution from 0.01 to 0.5 wt. % of at least one non-ionic surfactant, a second surfactant, at least 20 wt. % of at least one organic solvent containing at least one volatile constituent and water; wherein the at least one volatile constituent substantially evaporates from the plastic or lacquer surface to form the antistatic coating, wherein the coating substantially to completely prevents contamination of the plastic or lacquer surface due to electrostatic charging until the plastic or lacquer surface is cleaned or polarized, wherein the at least one non-ionic surfactant causes only very little to no foaming in a subsequent washing process;
wherein the at least one non-ionic surfactant causes only very little to no foaming in a subsequent washing process.

30. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution comprising from 0.01 to 0.5 wt. % of at least one non-ionic surfactant, at least 20 wt. % of at least one organic solvent containing at least one volatile constituent, a second non-ionic surfactant and water; wherein the at least one volatile constituent completely evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the at least one non-ionic surfactant causes only very little to no foaming in a subsequent washing process; wherein the antistatic solution.

31. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution comprising from 0.01 to 0.5 wt. % of at least one non-ionic surfactant, at least 20 wt. % of at least one organic solvent containing at least one volatile constituent and water; wherein the at least one volatile constituent substantially evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the at least one non-ionic surfactant causes only very little to no foaming in a subsequent washing process; wherein
the at least one non-ionic surfactant is similar or identical to at least one surfactant contained in an aqueous solution used when washing the surface.

32. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution comprising from 0.01 to 0.5 wt. % of at least one non-ionic surfactant, at least 20 wt. % of at least one organic solvent containing at least one volatile constituent and water; wherein the at least one volatile constituent substantially to completely evaporates from the plastic or lacquer surface to form the antistatic coating, wherein the antistatic coating substantially prevents contamination of the plastic or lacquer surface due to electrostatic charging until the plastic or lacquer surface is cleaned or polarized, wherein the at least one non-ionic surfactant causes only very little to no foaming in a subsequent washing process,
wherein at the antistatic solution contains a surfactant that is an ether phosphate.

33. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution comprising from 0.01 to 0.5 wt. % of at least one non-ionic surfactant, at least 20 wt. % of at least one organic solvent containing at least one volatile constituent and water; wherein the at least one volatile constituent substantially evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the at least one non-ionic surfactant causes only very little to no foaming in a subsequent washing process, wherein the antistatic solution contains a surfactant that is a phosphate ester.

34. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic comprising from 0.01 to 0.5 wt. % of at least one non-ionic surfactant, at least 20 wt. % of at least one organic solvent containing at least one volatile constituent and water; wherein the at least one volatile constituent substantially to completely evaporates from the plastic or lacquer surface to form the antistatic coating, wherein the antistatic coating substantially prevents contamination of the plastic or lacquer surface due to electrostatic charging until the plastic or lacquer surface is cleaned or polarized, wherein the at least one non-ionic surfactant causes only very little foaming in a subsequent washing process, wherein the antistatic solution contains at least one polyglycol, a polyacrylamide or a modified polyacrylamide.

35. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution comprising from 0.01 to 0.5 wt. % of at least one non-ionic surfactant, at least 20 wt. % of at least one organic solvent containing at least one volatile constituent and water; wherein the at least one volatile constituent substantially evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the at least one non-ionic surfactant causes only very little to no foaming in a subsequent washing process, wherein the antistatic solution contains a fatty amine ethoxylate of the formula $H(OCH_2-CH_2)_x-RN-(CH_2-CH_2O)_yH$, wherein R is an alkyl chain having 6 to 22 carbon atoms, x is from 3 to 20, and y is from 3 to 20.

36. An automated process comprising providing an antistatic coating on a plastic or lacquer surface after finishing and before polarization by applying an antistatic coating to the plastic or lacquer surface after finishing to form an antistatically coated plastic or lacquer surface by contacting the plastic or lacquer surface with an antistatic solution comprising from 0.01 to 0.5 wt. % of at least one non-ionic surfactant, at least 20 wt. % of at least one organic solvent containing at least one volatile constituent, an additional non-ionic surfactant, an ethoxylated or ethoxylated/propoxylated fatty alcohol of the formula $R-O(CH_2-CH_2O)_n-(C(CH_3)H-CH_2O)_m-H$, wherein R is an alkyl chain having 6 to 22 carbon atoms, n is the number of ethylene oxide units and ranges from 3 to 20 and m is the number of propylene oxide units and has ranges from 0 to 15 and water; wherein the at least one volatile constituent substantially evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the at least one non-ionic surfactant causes only very little to no foaming in a subsequent washing process.

37. An automated process comprising providing an antistatic coating on a plastic or lacquer surface after finishing and before polarization by applying an antistatic coating to the plastic or lacquer surface by contacting the plastic or lacquer surface with a solution comprising from 0.01 to 0.5 wt. % of at least one non-ionic surfactant, at least 20 wt. % of at least one organic solvent containing at least one volatile constituent, and water; wherein the at least one volatile constituent substantially to completely evaporates from the plastic or lacquer surface to form the antistatic coating, wherein the antistatic coating substantially prevents contamination of the plastic or lacquer surface due to electrostatic charging until the plastic or lacquer surface is cleaned or polarized, wherein the antistatic solution contains a combination of at least two surfactants, wherein said combination comprises a) at least one ethoxylated alkylamine and b) at least one of an ethoxylated alcohol or an ethoxylated/propoxylated fatty alcohol, wherein the weight ratio of a) to b) ranges from 9:1 to 1:9.

38. An automated process comprising providing an antistatic coating on a plastic or lacquer surface after finishing and before polarization by applying an antistatic coating to a plastic or lacquer surface by contacting the plastic or lacquer surface with a solution comprising from 0.01 to 0.5 wt. % of at least one non-ionic surfactant, at least 20 wt. % of at least one organic solvent containing at least one volatile constituent, and water; wherein the at least one volatile constituent substantially evaporates from the plastic or lacquer surface to form the antistatic coating, wherein the antistatic coating substantially or completely prevents contamination of the plastic or lacquer surface due to electrostatic charging until the plastic or lacquer surface is cleaned or polarized, wherein the antistatic solution consists of a surfactant mixture comprising an ethoxylated alkyl alcohol, an ethoxylated/propoxylated alkyl alcohol, an ethoxylated alkylphenol, an ethoxylated alkylamine, an ethoxylated/propoxylated alkylamine, a block copolymer, an ether sulfate, an ether phosphate or a phosphate ester.

39. An automated process comprising providing an antistatic coating on a plastic or lacquer surface after finishing and before polarization by applying an antistatic coating to a plastic or lacquer surface by contacting the plastic or lacquer surface with a solution comprising from 0.01 to 0.5 wt. % of at least one non-ionic surfactant, at least 20 wt. % of at least one organic solvent containing at least one volatile constituent, and water; wherein the at least one volatile constituent substantially evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the antistatic solution contains an ethoxylated alkylamine and an ethoxylated alkyl alcohol.

40. An automated process comprising providing an antistatic coating on a plastic or lacquer surface after finishing and before polarization by applying an antistatic coating to a plastic or lacquer surface by contacting the plastic or lacquer surface with a solution comprising from 0.01 to 0.5 wt. % of at least one non-ionic surfactant, at least 20 wt. % of at least one organic solvent containing at least one volatile constituent, and water; wherein the at least one volatile constituent substantially evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein at least one polyglycol, a polyacrylamide or a modified polyacrylamide are added to the antistatic solution.

41. An automated process comprising providing an antistatic coating on a plastic or lacquer surface after finishing and before polarization by applying an antistatic coating to a plastic or lacquer surface by contacting the plastic or lacquer surface with a solution comprising from 0.01 to 0.5 wt. % of at least one non-ionic surfactant, at least 20 wt. % of at least one organic solvent containing at least one volatile constituent, and water; wherein the at least one volatile constituent substantially evaporates from the plastic or lacquer surface to form the antistatic coating, wherein the antistatic coating substantially to completely prevents contamination of the plastic of lacquer surface due to electrostatic charging until the plastic or lacquer surface is cleaned or polarized, wherein the antistatic solution comprises an aqueous alcoholic solution containing at least 20 wt. % of an organic solvent or organic solvent mixture, and containing a fatty amine ethoxylate of the general structural formula $H(OCH_2-CH_2)_x-RN-(CH_2-CH_2O)_yH$, wherein R is an alkyl chain having 6 to 22 carbon atoms, x is from 3 to 20 and y is from 3 to 20.

42. An automated process comprising providing an antistatic coating on a plastic or lacquer surface after finishing and before polarization by applying an antistatic coating to a plastic or lacquer surface by contacting the plastic or lacquer surface with a solution comprising from 0.01 to 0.5 wt. % of at least one non-ionic surfactant, at least 20 wt. % of at least one organic solvent containing at least one volatile constituent, and water; wherein the at least one volatile constituent substantially evaporates from the plastic or lacquer surface to form the antistatic coating, wherein the antistatic coating substantially to completely prevents contamination of the plastic or lacquer surface due to electrostatic charging until the plastic or lacquer surface is cleaned or polarized, wherein the antistatic solution also contains another non-ionic surfactant of the formula $R-O(CH_2-CH_2O)_n-(C(CH_3)H-CH_2O)_m-H$, wherein R is an alkyl chain having 6 to 22 carbon atoms, n is the number of ethylene oxide units and ranges from 3 to 20 and m is the number of propylene oxide units and is 1.

* * * * *